(12) United States Patent
Luz et al.

(10) Patent No.: US 9,346,629 B2
(45) Date of Patent: May 24, 2016

(54) TRANSFERRING DEVICE, TRANSFERRING SYSTEM, AND METHOD

(71) Applicant: Mall Herlan MB GmbH, Neuhausen ob Eck (DE)

(72) Inventors: Uwe Luz, Neuhausen ob Eck (DE); Uwe Reich, Tuttlingen (DE)

(73) Assignee: Mall Herlan MB GmbH, Neuhausen ob Eck (DE)

( * ) Notice: Subject to any disclaimer, the term of this patent is extended or adjusted under 35 U.S.C. 154(b) by 0 days.

(21) Appl. No.: 14/377,974

(22) PCT Filed: Feb. 5, 2013

(86) PCT No.: PCT/EP2013/052204
§ 371 (c)(1),
(2) Date: Aug. 11, 2014

(87) PCT Pub. No.: WO2013/117528
PCT Pub. Date: Aug. 15, 2013

(65) Prior Publication Data
US 2015/0122615 A1    May 7, 2015

(30) Foreign Application Priority Data
Feb. 9, 2012  (DE) .......................... 10 2012 101 076

(51) Int. Cl.
*B65G 47/84*   (2006.01)
*B65G 47/91*   (2006.01)

(52) U.S. Cl.
CPC ............ *B65G 47/848* (2013.01); *B65G 47/846* (2013.01); *B65G 47/91* (2013.01); *B65G 2201/0252* (2013.01)

(58) Field of Classification Search
CPC .... B65G 47/91; B65G 47/911; B65G 47/915; B65G 47/918; B65G 47/848; B65G 47/843; B65G 47/846; B65G 77/323

USPC ...................... 198/608, 377.04, 377.08, 471.1
See application file for complete search history.

(56) References Cited

U.S. PATENT DOCUMENTS

| 4,768,919 | A | * | 9/1988 | Borgman | ............... | B65G 47/91 |
|||||||53/495|
| 4,822,234 | A | * | 4/1989 | Johnson | ............... | B65G 47/848 |
|||||||271/103|

(Continued)

FOREIGN PATENT DOCUMENTS

| CH | 678616 A5 | 10/1991 |
| DE | 3100792 A1 | 12/1981 |

(Continued)

*Primary Examiner* — Mark A Deuble
(74) *Attorney, Agent, or Firm* — Bachman & LaPointe, P.C.

(57) ABSTRACT

A transferring device for transferring and/or receiving cans, can blanks, or other containers out of or into a transferring or respectively receiving axis (U) which extends at an angle to a transport path (T), with multiple suction elements (3), which can be moved along the transport path (T) during transfer, each of which has at least one suction opening (4), and which can be connected to a negative pressure source, in order to retain the cans, can blanks, or other containers by means of suction during transport along the transport path (T), wherein the suction elements (3) are designed and/or arranged in a movable manner between a retracted and an extended position at least along some sections of the transferring and/or receiving axis (U), characterized in that the suction elements (3) are designed and arranged so as to be reversibly deformable during the movement along the transferring and/or receiving axis (U) such that the movement of the suction openings (4) together with the suctioned cans, can blanks or other containers is able to be brought about along the transferring and/or receiving axis (4), exclusively on the basis of the reversible deformation of the suction elements (3), said deformation being caused by the suction effect of the negative pressure source (5), and wherein a transfer path able to be overcome exclusively by deformation of the suction elements (3), for the cans, can blanks or other containers along the transferring and/or receiving axis (4) is at least 1 mm.

25 Claims, 5 Drawing Sheets

(56) References Cited

U.S. PATENT DOCUMENTS

| | | |
|---|---|---|
| 5,051,268 A | 9/1991 | Mally |
| 5,344,202 A | 9/1994 | Ramler et al. |
| 6,098,785 A * | 8/2000 | Van Maanen .......... B65G 47/31 198/459.8 |
| 7,017,961 B1 | 3/2006 | Parnell et al. |
| 2004/0094979 A1* | 5/2004 | Damhuis .............. B25J 15/0052 294/65 |
| 2008/0111388 A1* | 5/2008 | Kniss ................... B25J 15/0052 294/65 |
| 2009/0183970 A1 | 7/2009 | Ramminger |
| 2009/0256371 A1* | 10/2009 | Nankervis ............ B65G 47/848 294/188 |

FOREIGN PATENT DOCUMENTS

| | | |
|---|---|---|
| DE | 4333186 A1 | 4/1994 |
| DE | 10249571 A1 | 5/2004 |
| DE | 102004013444 A1 | 10/2005 |
| DE | 102005011130 A1 | 9/2006 |
| DE | 102009029778 A1 | 12/2010 |
| EP | 0119496 A1 | 9/1984 |

* cited by examiner

TRANSFERRING DEVICE, TRANSFERRING SYSTEM, AND METHOD

BACKGROUND OF THE INVENTION

The invention relates to a transferring device, preferably a can transferring device, in particular for cans or can blanks for transferring or receiving cans, can blanks or other containers, a transferring system with at least one such transferring device and a method for transferring cans, can blanks or other containers.

A known can transferring device is described for example in the applicant's DE 10 2009 029 778 A1. The known can transferring device concerns a so-called vacuum drum with several prism-shaped can mounts arranged adjacent to one another in circumferential direction, which are movable as a function of the circumferential position parallel to the rotation axis of the vacuum drum, in order to be able receive cans from chain pins of a first transport chain and transfer them to can mounts of a further vacuum drum. In order to be able to transfer the cans onto chain pins of a transport chain or to receive them therefrom, and in order to hold the cans or respectively can blanks during transport along the transport path about the rotation axis in circumferential direction, suction means are provided, in order to be able to act upon the cans or respectively can blanks with negative pressure, i.e. to secure them by suction. During the transfer of a can or respectively a can blank from a can mount of a first vacuum drum to a can mount, running in a synchronized manner, of an adjacent second transferring device, the can or respectively the can blank is unguided for a period of time or respectively is in a state of flight, after the negative pressure of the suction means of the first vacuum drum abates, the can is suctioned by the suction means of the second vacuum drum, but the can does not yet lie against the can mount of the second vacuum drum. During this time of transfer, in which the can is moved perpendicularly to the rotation axis of the vacuum drum, it can occur that the can is not correctly aligned, falls down and/or tilts or respectively is lost. The transfer becomes particularly problematic during the so-called gap filling of cans, because in this case the two vacuum drums do not run synchronously over the entire time, but rather one of the vacuum drums in one cycle is both accelerated, the transfer takes place, and is then slowed down again. Hereby, the synchronous running time is reduced to approximately half compared with the permanent synchronous running, whereby a higher faulty transfer rate occurs. This problem is exacerbated by the attempts at an increasingly shorter cycle rate, i.e. increased can throughput rates.

From DE 10 2004 013 444 A1 a device and a method are known for transporting and transferring cigarettes, wherein the cigarettes are transported by a transferring device along a transport path and are transferred perpendicularly hereto along a transferring axis. For transferring the cigarettes, pivotable mounts are provided which are able to be acted upon by vacuum and which are pivotable from radially inwards to radially outwards during a rotational movement of the transferring device. The known transferring device is basically not suitable for the transferring of cans or can blanks, because the objects which are to be transferred are received unbuffered in the mount or respectively because the transfer takes place in an unbuffered manner, which in the case of cans or can blanks would result in a damage to the surface. The known device is suitable only for the transferring of comparatively soft or respectively compressible objects such as cigarettes. Furthermore, the moved masses in the case of the construction of the known transferring device for transferring cans would be so great owing to the provision of the pivot mechanisms that the cycle rate would be very limited. Furthermore, the construction is complex, comparatively sluggish, and the transfer must be carried out in a positively controlled manner via corresponding link guides.

From DE 31 00 792 A1 a transferring device of tubes is known, in which for centering the tubes in mount pockets, suction line openings are provided. In other words, the position of the tubes relative to chain pins is fixed by means of the application of negative pressure. The transfer takes place along the longitudinal axis of the tube by moving a transferring linkage. Owing to the heavyweight mechanism connected herewith, the cycle rate is very limited.

From DE 102 49 571 A1 a transferring device is known for transferring small pharmaceutical containers such as ampoules. The ampoules are able to be transferred perpendicularly to a circular transport device, wherein for this, pistons equipped with suction heads are movable in radial direction. Here, also, the problem is the complex mechanism and the size of the moved masses. Owing to the conveying of the containers by means of a screw conveyor, the device is basically not suitable for transferring cans or suchlike, because damage to the surface inevitably results.

From DE 43 33 186 A1 a transferring device which is able to be operated exclusively in a clocked manner is known for transferring blister packages. The known device must pause for a transfer cycle, i.e. can not rotate further, whereby the cycle rate is very limited. The device operates with comparatively rigid suction cups, which are movable along a transferring axis via a complex movement mechanism. Not only due to the clocked mode of operation (no rotation on transfer), but also due to the size of the moved masses, quick cycle rates are not able to be realized.

From DE 10 2005 011 130 A1 a transferring device for cans is known, wherein the transferring takes place via pivoted levers arranged pivotably relative to a drum. Here also, low limits are set for the cycle rate owing to the large moved masses.

EP 0 119 496 A describes a transferring device for hollow glass containers, wherein the mounts for the hollow glass containers are acted upon by vacuum. As the hollow glass containers are transferred from a conveyor belt to a conveyor belt (transport belt), i.e. the hollow glass containers can rest at the time of transfer in vertical direction downwards on transport belts, there is no problematic free flight phase as in the prior art during the transferring of cans, for example between two vacuum drums.

CH 678 616 A5 describes a transferring device for transferring pastries or confectioneries with a complex transferring mechanism, in which transferring arms must be moved relative to a drum. The known device is not suitable for the quick transferring of cans.

SUMMARY OF THE INVENTION

Proceeding from the above-mentioned prior art, the invention is based on the problem of indicating an improved transferring device, by which the risk of faulty transfers is reduced. Furthermore, the object consists in indicating a transferring system with at least one correspondingly improved transferring device, and a method for transferring cans, in particular for operating a device constructed according to the concept of the invention.

This object is achieved with regard to the transferring device, the transferring system, and the method by the features disclosed herein.

Advantageous further developments of the invention are indicated in the subclaims. All combinations of at least two of the features disclosed in the description, the claims and/or the figures fall within the scope of the invention. To avoid repetitions, features disclosed according to the device are to be deemed to be disclosed and claimable according to the method. Likewise, features disclosed according to the method are to be deemed to be disclosed and claimable according to the device.

The invention is based on the idea of constructing the suction means, in particular the suction elements thereof, such that these at least along some sections, together with the suctioned can or respectively the suctioned can blank (or other container) are able to be moved along the transferring or respectively receiving axis extending at an angle, in particularly perpendicularly to the transport path, in order to shorten the unguided flight time period preferably down to zero. In other words, according to the invention the suction elements are constructed and arranged for direct abutment against the transfer goods in a reversibly deformable manner, such that the suction openings thereof are able to be moved at an angle to the direction of movement (transport direction) of a suction element fixing, preferably to an optional, in particular prism-shaped, mount, preferably can mount, and namely between a retracted position, in which the can or respectively the can blank (or another container) is held against the deformed (compressed) suction element and preferably against the optional can mount, and an extended position, wherein the extended position is not imperatively, but preferably, a position in which the can lies again against a further transferring device, preferably actuated running in a synchronous manner at least at the time of transfer, and still further preferably is held there by suction. An embodiment is preferred, in which mounts for supporting the goods, in particular can mounts, are dispensed with, and the can, the can blank or other container rests exclusively on at least one elastically deformed suction element. The moving of the suction elements into the retracted position takes place preferably only on the basis of the suction effect of a negative pressure source and a reversible deformation, resulting therefrom, of the suction elements. In other words, it is particularly preferred if the can, the can blank or the other container is moved exclusively on the basis of the deformation of the suction element due to suction force relative to a suction connection which supplies the suction element with negative pressure, wherein preferably no additional actuator means are associated with the suction connection, but rather this remains permanently stationary relative to a rotation axis of a transferring device constructed as a vacuum drum or remains stationary relative to a belt body of a transferring device constructed as a pocket belt. The further the suction opening together with the can or respectively the can blank is movable along the transferring or respectively receiving axis in the direction of a transferring position, in particular in the direction of a further transferring device, the less is an unguided time span or respectively free flight time span of the can or respectively of the can blank, and the less is the risk of faulty transfer.

In order to achieve as high throughput rates as possible, provision is made according to the invention that the moving of the can, of the can blank or of the other container along the transferring and/or receiving axis takes place during the transporting along the transport path, i.e. in the case of a vacuum drum with a rotating vacuum drum or respectively in the case of a pocket belt with a moving pocket belt.

An embodiment is most especially preferred in which the suction elements are constructed as a bellows which folds together elastically in the manner of a concertina on suctioning of the cans, of the can blank or of the other container on application of negative pressure. It is sufficient here if the suction element, for bridging the transfer path, has at least one fold, comprising two wall sections running at an angle to one another, which are pivotable relative to one another about a connecting edge (a connecting joint) preferably constructed as a type of film hinge, in particular in order to lie at least in some sections, preferably at least approximately completely, in the maximum deformed state.

A can transferring device constructed according to the concept of the invention, preferably realized as a vacuum drum or pocket belt, enables the realization of very small cycle times. Furthermore, with the use of at least one transferring device constructed according to the concept of the invention, it is no longer necessary that the transferring of a can or blank from the transferring device or respectively the receiving of a can into the transferring device takes place substantially along a vertical axis, but rather the transferring and/or receiving axis can take place at an angle to a vertical, even at a 90° angle.

In the present document, the term can transferring device is used as a synonym for transferring device, and can mount as a synonym for mount, and can transferring system as a synonym for transferring system, and can as a synonym for container, e.g. bottles, tube blanks, tubes, injection moulded containers, cups, packaging containers. These concepts are not to restrict the scope of protection to cans or can blanks, merely in a preferred embodiment.

As explained, provision is made according to the invention that the suction elements, preferably exclusively, on the basis of the suction effect of suction means comprising these, with a suctioned can or suctioned can blank are movable from the extended position into the retracted position. It is most particularly expedient when in this case separate actuator means from the suction means are dispensed with. For this, it is preferred to configure in a deformable manner the suction elements or their pressure-directing, preferably pipe-like connection to a suction connection which is stationary with respect to the transferring and/or receiving axis. Preferably, the suction elements are arranged such that these suction the can, the can blank or the other containers on the superficies surface side, i.e. perpendicularly to its vertical extent.

Preferably, the movement path, preferably covered exclusively by reversible deformation of the suction elements, for moving the cans, can blanks or other containers along the transferring and/or receiving axis is at least 1 mm. Preferably, this movement path is selected from a range of values between 1 mm and 10 mm, preferably between 2 mm and 5 mm, still further preferably between 2 mm and 4 mm. As mentioned, it is particularly advantageous if this path is overcome exclusively by the reversible deformation of the suction elements, resulting from the application of negative pressure, i.e. preferably further movement mechanisms are dispensed with. Again in other words, it is preferred if a fixing section of the suction elements in the case of the construction of the transferring device as a vacuum drum has permanently the same distance from the rotation axis. In the case of the construction of the transport device as a conveyor belt, in particular as a pocket belt, the fixing region of the suction elements is preferably permanently at the same distance from the belt body.

It is most particularly preferred if the suction elements are constructed such that they are reversibly deformable over a greater distance than they have to be deformed in installed state in the transport device for overcoming the transport path. In other words, it is preferred if the suction elements are constructed such that in the operation of the transport device they are not deformed to a maximum extent, but only over a partial path of the maximum deformability, in order to hereby optimize the deformation speed and to obtain a particularly robust arrangement. It is particularly expedient if the path of the maximum reversible deformation along the transferring and/or receiving axis, for example by manual application of force, is at least 2 mm, preferably at least 4 mm. Most particularly preferably, this maximum reversible deformation path is selected from a range of values between 2 mm and 12 mm, most particularly preferably between 4 mm and 12 mm.

As already mentioned in the introduction, it is particularly preferred if the cans, can blanks or containers during transport in the transport direction rest exclusively on at least one, preferably on at least two suction elements, i.e. it is preferred, for the optimum protection of the surface, to dispense with corresponding mounts with a negative contour corresponding to the outer contour of the objects which are to be transported. For the case where, for ensuring as smooth a transport as possible, such mounts, in particular can mounts, are provided, the cans, can blank or other containers are preferably moved exclusively by deformation of the suction elements relative to the mounts along the transferring and/or receiving axis.

As mentioned in the introduction, it is particularly preferred if the can transferring device is constructed as a vacuum drum. Such a vacuum is distinguished in that the can mounts are arranged on an imaginary cylinder superficies surface, and namely concentrically around a rotation axis. The optionally provided can mounts, preferably together with the at least one suction element associated respectively therewith or formed respectively thereby, are preferably arranged so as to be movable in a manner known per se via a link as a function of the circumferential position along the rotation axis. In the case of a vacuum drum, the transferring and/or receiving axis preferably extends in radial direction, in relation to the rotation axis of the vacuum drum.

Alternatively, the can transferring device can also be constructed as a so-called revolving pocket belt, wherein preferably a can or respectively a can blank is able to be received in each pocket. The pockets are formed by the, in particular prism-shaped, can mounts, wherein at least one suction element, preferably movable perpendicularly to the transport path of the can mounts, is associated with each can mount, or each can mount forms such a suction element. The pocket belt is preferably guided around at least two deflection rollers.

Preferably, the suction elements are constructed as spring elements, wherein the elastic force acts upon the at least one suction opening, i.e. the circumferential edge of the suction opening along the transferring and/or receiving direction away from the associated can mount.

There are various possibilities with regard to the configuration of the suction elements. Thus, these can preferably produce directly themselves the connecting of a stationary suction connection, preferably connected with a central negative pressure supply, and the suction opening of the suction element.

There are also various possibilities with regard to the geometric configuration of the suction elements. Thus, these can fully delimit their at least one suction surface in a marginal region, which is preferred. However, it is also conceivable to form the suction elements such that secondary air is deliberately drawn in in the region of the suction opening.

It is most particularly expedient if the suction elements have a contact surface constructed and specific for abutment against the can or the can blank which is to be suctioned, preferably embodied as a sealing surface, wherein this contact surface is preferably constructed from an elastomer material. This contact surface preferably directly surrounds the suction opening. It is particularly preferred if the suction elements are constructed from elastomer material completely or at least partially, most particularly preferably at least on the can side, i.e. in the region of the above-mentioned contact surface. A construction from elastomer material also enables the likewise above-mentioned embodiment of an elastic deformability.

For the case of the provision of mounts for the cans, can blanks or other containers, provision is made that the suction elements are separate elements from the can mounts, which elements are arranged so as to be movable relative to the can mounts along the transferring and/or receiving axis. Preferably, in this case, the can mounts are arranged so not to be movable along the above-mentioned axis.

The invention also relates to a transferring system in particular for, or as part of, a can manufacturing facility, comprising a first transferring device according to the concept of the invention. The transferring system comprises, in addition to the first transferring device, a further (second) transferring device, which particularly preferably is likewise constructed according to the concept of the invention. The transferring devices are actuated so that the respectively transferring can mount, at least temporarily, runs synchronously with the respectively receiving can mount. These can be identically constructed or differently configured transferring devices. It is particularly preferred if two transferring devices, constructed as vacuum drums, interact. It is also possible to combine a vacuum drum with for example a transferring device embodied as a pocket belt, or to have two pocket belt transferring devices interacting.

In further development of the invention, provision is advantageously made that the two can transferring devices are arranged relative to one another such that the cans or can blanks are able to be transferred in vertical direction, in particular from below upwards, i.e. contrary to the effect of gravity, or alternatively are not transferred in a vertical direction from one transferring device to the other, but rather at an angle hereto, in particular at an angle between approximately 10° and approximately 170°, preferably between approximately 20° and 160° to the vertical. This arrangement is possible owing to the use of at least one transferring device constructed according to the concept of the invention, because the can, according to the configuration of the can transferring device, is free or respectively uncaught only over a minimal time span, preferably not at all, but rather is preferably guided over the entire transfer path by at least one suction element, or respectively is moved therewith.

The invention also specifies a method for transferring and/or receiving cans, can blanks or other containers, in particular by means of a transferring device constructed according to the concept of the invention and/or with a transferring system constructed according to the concept of the invention. Provision is made according to the invention that the moving of the can, of the can blank or of the other container along the transferring and/or receiving axis takes place at least partially, preferably over the entire movement distance, by a reversible deformation, due to the application of suction power, of a suction element having a suction opening. It is particularly expedient here if the above-mentioned transferring and/or receiving axis takes place at an angle, in particular perpendicular to a transport path or respectively a transport direction of can mounts of a can transferring device. Preferably, a central vacuum-generating device, in particular a vacuum compressor, preferably with a vacuum tank, is associated with the suction means, wherein it is still further preferred if the negative pressure applied at the system is between 800 and 900 mbar absolute pressure. This is therefore preferably a vacuum between approximately 100 and 200 mbar, in relation to an atmospheric pressure of on average 1000 mbar.

It is particularly expedient, if negative pressure is applied at the suction opening of the receiving can mount, if the negative pressure at the suction opening of the transferring can mount of the adjacent can transferring device is preferably reduced down to zero.

In further development of the invention, provision is advantageously made that the can or the can blank in a retracted position of the then reversibly compressed suction element lies against a can mount of a first transferring device and/or that the can or the can blank in an extended position of the suction element lies against a can mount of a second, i.e. further adjacent transferring device.

It is particularly advantageous if at least at a time, preferably at the start of a transfer, at least two suction elements of two different transferring devices lie against the can, in particular in diametrically opposite positions, wherein vacuum is applied at least at one of the two suction elements at this time.

According to the invention, provision is made that the suction element, which is separate from an optional can mount, is deformed reversibly, in particular elastically, during the displacement movement of the can in the direction of the can mount and/or in the retracted position of the suction element. This can thus concern for example a duct-shaped or respectively sleeve-shaped component, in particular in the form of a bellows, of an elastomer material, which is deformed during the movement towards the can mount.

BRIEF DESCRIPTION OF THE DRAWINGS

Further advantages, features and details of the invention will emerge from the following description of preferred example embodiments and with the aid of the drawings.

These show in.

In the figures, identical elements and elements with identical function are marked by the same reference numbers.

DETAILED DESCRIPTION

Figure 1:
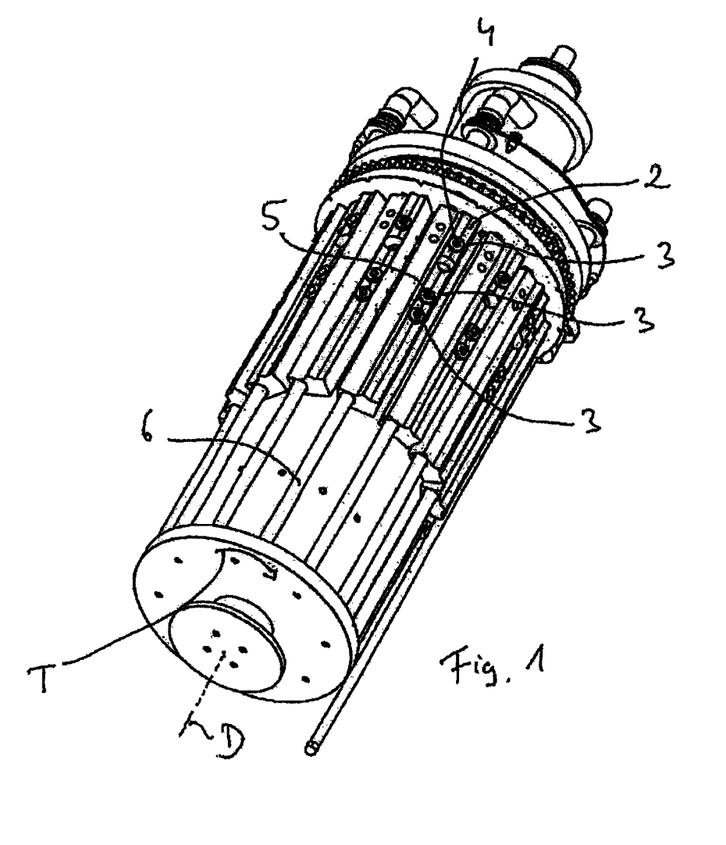
FIG. 1: a perspective view of a can transferring device constructed as a vacuum drum.
Figure 2:
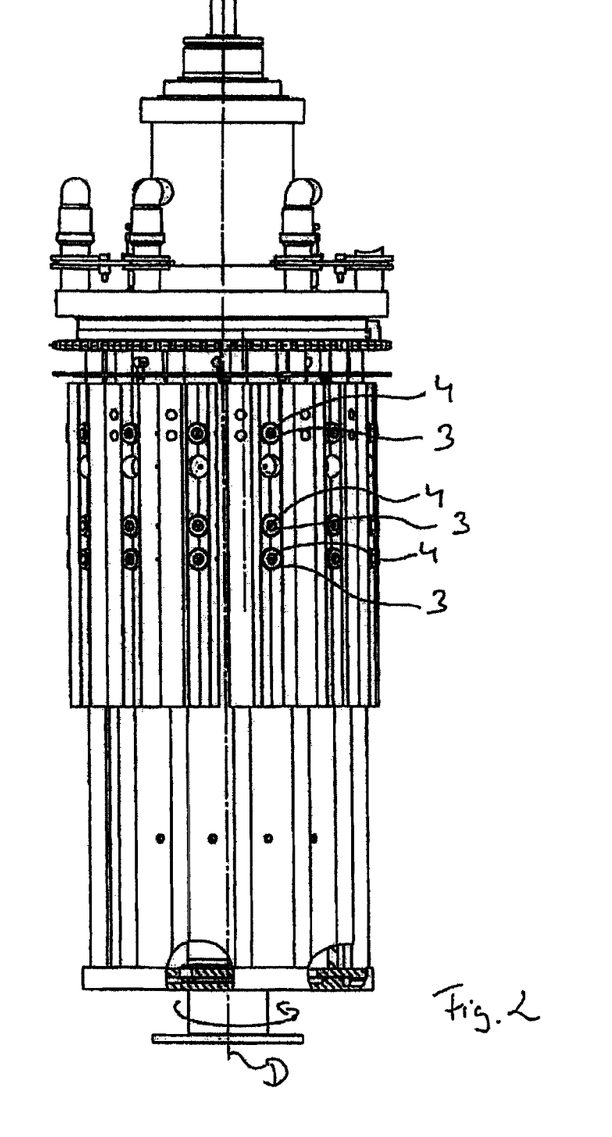
FIG. 2: a side view of the can transferring device according to FIG. 1, FIG. 3: a cross-sectional view of the can transferring device according to FIG. 2 approximately at the height of suction elements constructed from elastomer material, shown in combination with a further can transferring device.
Figure 3:
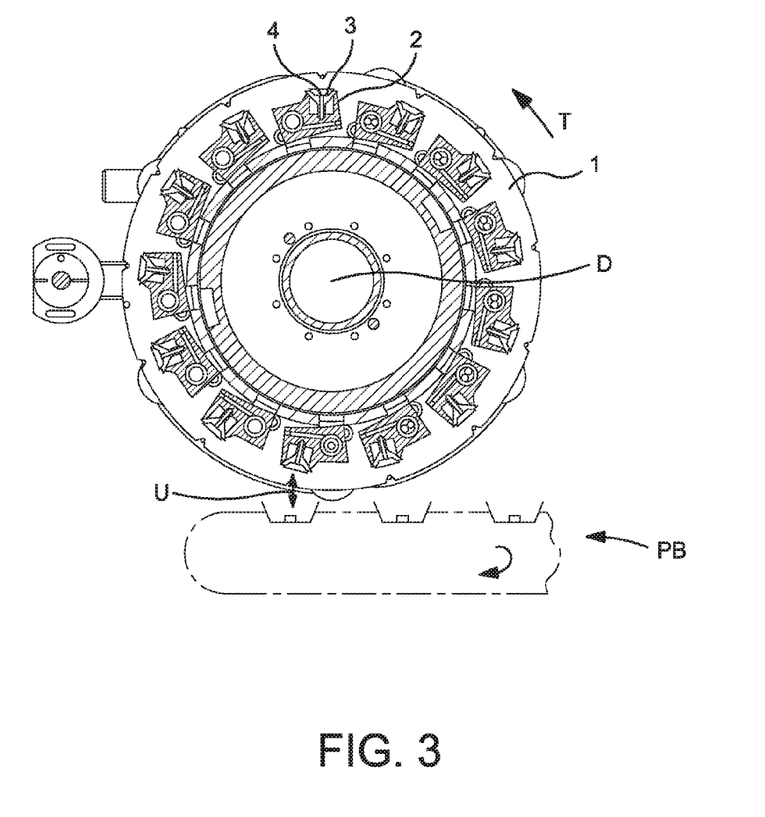

In FIGS. 1 to 3 a can transferring device for cans and can blanks, constructed as a vacuum drum, is shown in different views, partly in section. The can transferring device 1 comprises a plurality of prismatically shaped can mounts 2, arranged in circumferential direction around a rotation axis D, for abutment respectively of a can, which is not illustrated, or of a can blank, which is not illustrated. In the example embodiment which is shown, several suction elements 3 are associated with each can mount 2, which suction elements are arranged distributed over the axial extent of the can mounts 2. Basically, the invention is able to be realized with a single suction element 3 per can mount 2, wherein the holding security is increased with several suction elements 3. In the example embodiment which is shown, each suction element 3 is provided with a suction opening 4 which is able to be acted upon by vacuum. For this, the suction elements 3 are part of suction means 5, known per se, which are not illustrated further. The can mounts 2, with a rotating vacuum drum about the rotation axis D are moved along a transport path T, which in the example embodiment which is shown has a circular shape and, in the case of the construction of the can transferring device as a pocket belt, can have almost any desired geometries.

The can mounts 2 are movable not only along the transport path T, i.e. along a circular path here, but also parallel to the rotation axis D. For this, the can mounts 2 are guided on axial guide rods 6. To actuate this axial displacement movement, the can mounts 2 run in the interior of the vacuum drum on a fixed curved track.

The can transferring device 1 which is shown is now distinguished in particular in that the suction elements 3, as can be seen in particular from the cross-sectional view according to FIG. 3, are movable perpendicularly to the transport path T and perpendicularly to the rotation axis D along a transferring and/or receiving axis U, in order to ensure a guidance during the receiving and/or transferring at least over a portion of the movement distance of the can, preferably over the entire movement distance along the axis U, in order to prevent or at least reduce as far as possible a free flight phase between two transferring devices, as is necessary in the prior art.

In the example embodiment which is shown, the suction elements 3 are constructed from an elastic material and are fixed on the rear side on the respectively associated can mount 2. Hereby, the suction elements 3 are movable along the axis U. The suction elements 3 are shown in an extended position, in which they are ready for the transferring of a can or of a can blank. The position of the can transferring device 1 which is shown in a can transferring system is preferably positioned relative to a further can transferring device in the form of a pocket belt (PB), illustrated in FIG. 3, so that the suction elements 3 of a can mount can touch the can which is to be received when the latter is still suctioned on the further transferring device, so that the entire transfer path can be overcome without a free flight phase. As soon as the suction elements 3 of the transferring device 1 which is shown have taken over the can or respectively the can blank, these are moved radially inwards into a retracted position, and namely in the practical example embodiment exclusively owing to the suction effect of the suction means. This is possible because the suction elements 3 are constructed from a deformable material, and/or have a deformable geometry, for example in the manner or form of a bellows. In the retracted radially inner position, the can which has been taken over rests radially internally on the can mount 2 and is, at the same time, continued to be held or respectively fixed by the suction elements 3.

Figure 4:
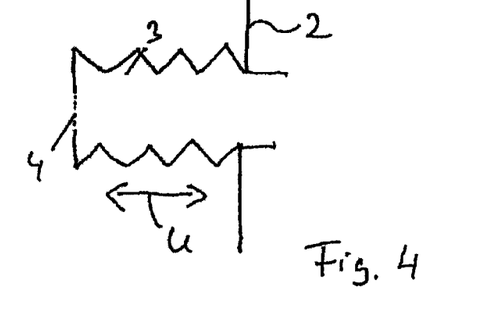
FIG. 4: a preferred embodiment of a suction element of elastomer material, which on moving along the transferring and/or receiving axis is elastically adjustable or respectively compressible.
Figure 5:
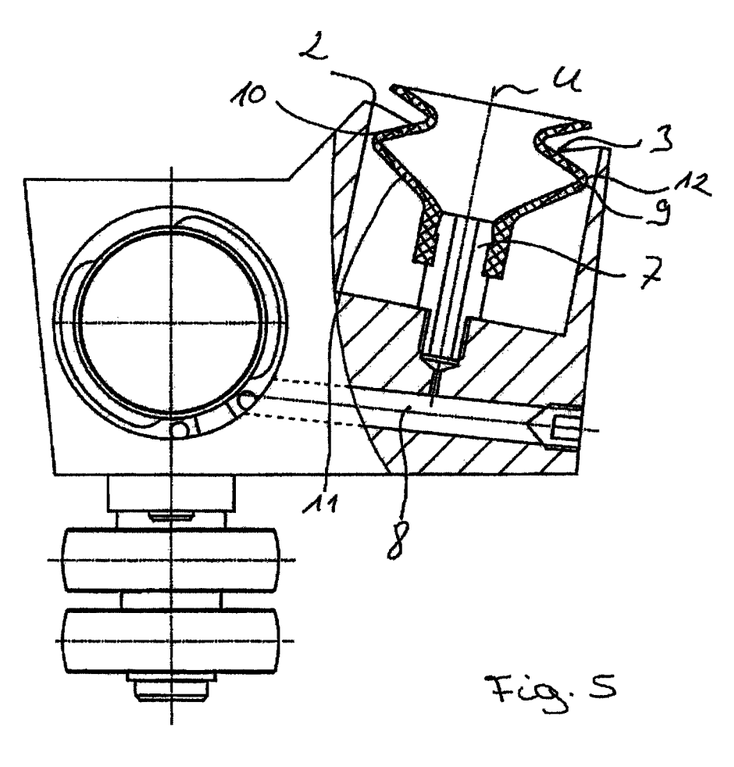
FIG. 5: a particularly preferred embodiment of a suction element of elastomer material, which is elastically compressible on moving along the transferring and/or receiving axis and hereby covers a path of approximately 2 mm.

In FIGS. 4 and 5, different configurations and arrangements of suction elements 3 are illustrated in a very exemplary and diagrammatic manner. It can be seen that all the embodiments of suction elements 3 have respectively at least one suction opening 4, which is movable along the transferring and/or receiving axis U with or without a can or respectively can blank exclusively on the basis of the deformation of the bellows-like suction element.

FIG. 4 shows a preferred variant of a suction element 3 constructed as a bellows, as is used in a similar configuration in the example embodiment according to FIGS. 1 to 3. The suction element 3 is constructed here completely, but at least partially, from an elastomer material and is compressed on moving into the retracted position. An embodiment of nonelastic material with corresponding, e.g. bellows-like geometry, is also possible. In the illustrated embodiment, the moving radially inwards in the direction of the can mount 2 can take place exclusively due to the suction effect. As soon as the can or respectively the can blank is suctioned, the application of negative pressure of the suction element 3 leads to its reversible deformation.

In FIG. 5 a most particularly preferred variant of a suction element 3, constructed as a bellows, is shown, as is used in the example embodiments according to FIGS. 1 to 3. The suction element 3 is constructed completely from elastomer material and is connected with a suction connection 7 in a form-fitting manner by engaging behind, which suction connection produces the connection to a negative pressure line 8, which is connected with a negative pressure source, not shown, of the suction means.

In this particularly preferred embodiment, the can which is to be suctioned, the can blank which is to be suctioned, or other container, is moved exclusively by deformation of the suction element, due to suction power, along the transferring and/or receiving axis U in the direction of the suction connection. During the moving process, the can, the can blank or the container lies on the shell side against the mount opening, and the negative pressure which is building up moves the transport goods exclusively by deformation of the suction element 3 relative to the suction connection 7 in the direction of an optional mount 2 for abutment of the transport goods. It is conceivable, in an alternative embodiment, to dispense with such a mount 2. In this case, the suction element 3 would be deformed to a maximum extent, in the example embodiment which is shown by distinctly more than the above-mentioned 2 mm.

The suction element 3 comprises an annular fold 9 over the full circumference, wherein here exclusively a single fold 9 is provided, which is preferred—however, as in the example embodiment according to FIG. 4 also more than one complete fold 9 can be provided in an axially adjacent manner. The fold 9 comprises or respectively is formed from two wall sections 10, 11 arranged axially adjacent and at an angle to one another, which are connected with one another in a single piece in the region of a connecting edge or of a joint 12 constructed as a film hinge, and which are movable towards one another on suctioning of the can, of the can blank or of the other container, so that the angle between the wall sections 10, 11 reduces in size and consequently the can, the can blank or the other container is moved in the direction of the suction connection 7 exclusively on the basis of this reversible deformation, here compressing, from the extended position of the suction element 3 which is shown.

The invention claimed is:

1. A transferring device for transferring and/or receiving cans, can blanks, or other containers out of or into a transferring or respectively receiving axis (U) which extends at an angle to a transport path (T), with multiple suction elements, which can be moved along the transport path (T) during transfer, each of which has at least one suction opening, and which can be connected to a negative pressure source, in order to retain the cans, can blanks, or other containers by means of suction during transport along the transport path (T), wherein the suction elements are designed and/or arranged in a movable manner between a retracted and an extended position at least along some sections of the transferring and/or receiving axis (U), wherein the suction elements are designed and arranged so as to be reversibly deformable during the movement along the transferring and/or receiving axis (U) such that the movement of the suction openings together with the suctioned cans, can blanks or other containers is able to be brought about along the transferring and/or receiving axis, exclusively on the basis of the reversible deformation of the suction elements, said deformation being caused by the suction effect of the negative pressure source, and wherein a transfer path able to be overcome exclusively by deformation of the suction elements, for the cans, can blanks or other containers along the transferring and/or receiving axis is at least 1 mm, wherein the transferring device is constructed as a vacuum drum and the suction elements are movable with mounts, separate therefrom or formed thereby, at an angle to the transferring and/or receiving axis (U), in order to receive the cans, can blanks or other containers from a transport chain having chain pins, or to transfer them thereon, or in order to transfer the cans, can blanks or other containers onto a further transferring device, or to receive these therefrom.

2. The transferring device according to claim 1, wherein the suction elements are constructed such that these are deformable, reversibly along the transferring and/or receiving axis by a path of at least 2 mm.

3. The transferring device according to claim 2, wherein the suction elements are deformable reversibly by a path of a range of values between at least 2 mm and 12 mm.

4. The transferring device according to claim 2, wherein the suction elements are deformable reversibly by a path of a range of values between 4 mm and 12 mm.

5. The transferring device according to claim 1, wherein for supporting the cans, can blanks or containers, exclusively the suction elements are provided, or wherein mounts for the cans, can blanks or other containers are associated with the suction elements, relative to which the suction elements are movable by deformation.

6. The transferring device according to claim 1, wherein the further transferring device is constructed as a pocket belt having pockets, wherein the pockets are formed mounts.

7. The transferring device according to claim 1, wherein the suction elements are constructed as spring means which are arranged applying elastic force to the associated suction opening along the transferring and/or receiving axis (U) in the direction of the extended position, in the case of suction elements separate from the mounts, away from the associated mount.

8. The transferring device according to claim 1, wherein the suction elements are constructed completely, or at least on the can side, from an elastomer material in the region of their suction openings.

9. The transferring device according to claim 1, wherein the suction elements have a contact surface constructed and specific for abutment against the can, the can blank or other container which is to be suctioned as a sealing surface.

10. The transferring device according to claim 1, wherein the suction elements are movable relative to mounts, associated therewith, along the transferring and/or receiving axis (U).

11. A transferring system for, or as part of, a can manufacturing facility, comprising a first transferring device according to claim 1 and at least a second transferring device constructed according to claim 1.

12. The transferring system according to claim 11, wherein the first and the second transferring device are arranged relative to one another and actuated such that the cans and/or can blanks and/or other containers are transferable in vertical direction, or alternatively at an angle to a vertical between 10° and 170°, along the transferring and/or receiving axis (U) between the transferring devices.

13. The transferring system according to claim 12, wherein the cans and/or can blanks and/or other containers are transferable in a vertical direction from below upwards.

14. The transferring device according to claim 1, wherein the transferring or respectively receiving axis (U) extends perpendicular to the transport path (T).

15. The transferring device according to claim 1, wherein the suction elements are designed as bellows.

16. The transferring device according to claim 1, wherein the transfer path is selected from a range of values between 1 mm and 10 mm.

17. The transferring device according to claim 1, wherein the transfer path is selected from a range of values between 2 mm and 5 mm.

18. The transferring device according to claim 1, wherein the transfer path is selected from a range of values between 2 mm and 4 mm.

19. The transferring device according to claim 1, wherein the suction elements are movable perpendicularly to the transferring and/or receiving axis (U).

20. The transferring device according to claim 1, wherein the further transferring device is a vacuum drum.

21. A method for transferring or receiving cans or can blanks or other containers, by means of a transferring device according to claim 1 for transferring and/or receiving cans, can blanks, or other containers out of or into a transferring or respectively receiving axis (U) which extends at an angle to a transport path (T), with multiple suction elements, which can be moved along the transport path (T) during transfer, each of which has at least one suction opening, and which can be connected to a negative pressure source, in order to retain the cans, can blanks, or other containers by means of suction during transport along the transport path (T), wherein the suction elements are designed and/or arranged in a movable manner between a retracted and an extended position at least along some sections of the transferring and/or receiving axis (U), wherein the suction elements are designed and arranged so as to be reversibly deformable during the movement along the transferring and/or receiving axis (U) such that the movement of the suction openings together with the suctioned cans, can blanks or other containers is able to be brought about along the transferring and/or receiving axis, exclusively on the basis of the reversible deformation of the suction elements, said deformation being caused by the suction effect of the negative pressure source, and wherein a transfer path able to be overcome exclusively by deformation of the suction elements, for the cans, can blanks or other containers along the transferring and/or receiving axis is at least 1mm, wherein the transferring device is constructed as a vacuum drum and the suction elements are movable with mounts, separate therefrom or formed thereby, at an angle to the transferring and/or receiving axis (U), in order to receive the cans, can blanks or other containers from a transport chain having chain pins, or to transfer them thereon, or in order to transfer the cans, can blanks or other containers onto a further transferring device, or to receive these therefrom, wherein at least one can, one can blank or one other container is moved at an angle, to a transport path (T) along a transferring and/or receiving axis (U), wherein the can, the can blank or other container during the transfer is moved further along the transport path (T), and wherein the moving of the can, the can blank or the container along the transferring and/or receiving axis (U), takes place at least partially together with at least one suction element having a suction opening, wherein the moving of the suction opening together with the suctioned can, of the can blank or other container along the transferring and/or receiving axis is brought about exclusively by a reversible deformation, brought about by the suction effect of the negative pressure source, of the suction elements, constructed as a bellows, and that a transfer path, exclusively by deformation of the suction elements, for the cans, can blanks or other containers, is at least 1 mm.

22. The method according to claim 21, wherein the can, the can blank or the container in a retracted position of the suction element lies against a mount of a first transferring device and/or wherein the can, the can blank or the container in an extended position of the suction element lies against a can mount of a second transferring device.

23. The method according to claim 22, wherein at least at one time at least two suction elements of two transferring devices lie against the can, the can blank or other container, in diametrically opposite positions.

24. The method of claim 21, wherein the at least one can, one can blank or one other container is moved perpendicularly to the transport path (T).

25. The method of claim 21, wherein the moving of the can, the can blank or the container along the transferring and/or receiving axis (U) takes place over the entire movement distance together with the at least one suction element having a suction opening.

* * * * *